US012778211B2

(12) United States Patent
Song et al.

(10) Patent No.: US 12,778,211 B2
(45) Date of Patent: Nov. 3, 2026

(54) ELECTRONIC CIGARETTE HAVING DOUBLE ATOMIZING CORES AND METHOD FOR CONTROLLING HEAT BALANCE THEREOF

(71) Applicant: Shenzhen VapeEZ Technology LTD, Shenzhen (CN)

(72) Inventors: Maoqing Song, Shenzhen (CN); Dehui Zou, Shenzhen (CN); Zhenyu Huang, Shenzhen (CN)

(73) Assignee: SHENZHEN VAPEEZ TECHNOLOGY LTD, Shenzhen (CN)

( * ) Notice: Subject to any disclaimer, the term of this patent is extended or adjusted under 35 U.S.C. 154(b) by 629 days.

(21) Appl. No.: 18/202,018

(22) Filed: May 25, 2023

(65) Prior Publication Data

US 2024/0206561 A1 Jun. 27, 2024

(30) Foreign Application Priority Data

Dec. 23, 2022 (CN) ........................ 202211668676.9

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/46* (2020.01); *H05B 1/0225* (2013.01); *H05B 2203/005* (2013.01)

(58) Field of Classification Search
CPC ........................................................ A24F 40/57
See application file for complete search history.

(56) References Cited

U.S. PATENT DOCUMENTS 11,006,669 B2 * 5/2021 Reevell .................. G01F 23/22
2014/0366898 A1 * 12/2014 Monsees ................ A24F 40/30
131/329
(Continued)

FOREIGN PATENT DOCUMENTS

CN 210992330 U 7/2020
CN 112316261 A 2/2021
(Continued)

OTHER PUBLICATIONS

First Office Action dated Jul. 15, 2023; CN Application No. 202211668676.9; 5 pages (non-English).
(Continued)

*Primary Examiner* — Russell E Sparks
*Assistant Examiner* — Michael T Fulton
(74) *Attorney, Agent, or Firm* — CANTOR COLBURN LLP

(57) ABSTRACT

An electronic cigarette having double atomizing cores and a method for controlling the heat balance thereof. The electronic cigarette having double atomizing cores includes: a cigarette rod, the cigarette rod includes an oil compartment having a lithium battery, a circuit board, a fixing plate, a first atomizing core, and a second atomizing core arranged therein; the lithium battery supplies power to the circuit board, and the circuit board controls the first atomizing core and the second atomizing core to maintain balanced heating under a single-core alternating operating mode and a double-core simultaneous operating mode, the fixing plate is used for fixing the first atomizing core and the second atomizing core and is connected with the positive and negative electrodes of the lithium battery.

8 Claims, 4 Drawing Sheets

(51) Int. Cl.

| | |
|---|---|
| ***A24F 40/46*** | (2020.01) |
| ***H05B 1/02*** | (2006.01) |

(56) References Cited

U.S. PATENT DOCUMENTS

| | | | | |
|---|---|---|---|---|
| 2018/0043114 | A1* | 2/2018 | Bowen | A61M 15/06 |
| 2021/0268215 | A1* | 9/2021 | Israel | A61M 11/042 |
| 2023/0301366 | A1 | 9/2023 | Li et al. | |

FOREIGN PATENT DOCUMENTS

| | | | |
|---|---|---|---|
| CN | 112931970 | A | 6/2021 |
| CN | 214151517 | U | 9/2021 |
| CN | 215189405 | U | 12/2021 |
| CN | 114073331 | A | 2/2022 |
| CN | 114098584 | A | 3/2022 |
| CN | 217695259 | U | 11/2022 |
| JP | 2011068152 | A | 4/2011 |

OTHER PUBLICATIONS

Second Office Action dated Aug. 25, 2023; CN Application No. 202211668676.9; 6 pages (non-English).

Search dated Jul. 12, 2023; CN Application No. 202211668676.9; 3 pages (non-English).

* cited by examiner

ELECTRONIC CIGARETTE HAVING DOUBLE ATOMIZING CORES AND METHOD FOR CONTROLLING HEAT BALANCE THEREOF

CROSS-REFERENCE TO RELATED APPLICATIONS

This application claims the benefit of Chinese patent application No. 202211668676.9 filed on Dec. 23, 2022, the entire contents of which are incorporated herein by reference.

TECHNICAL FIELD

The present application relates to electronic cigarettes, and in particular, to an electronic cigarette having double atomizing cores and a method for controlling the heat balance thereof.

BACKGROUND

Electronic cigarettes are electronic atomization devices for heating and atomizing e-liquid through a heating wire; heat of different powers is output by driving and heating the heating wires having different resistance through a lithium battery, so as to atomize the e-liquid around the heating wire, thereby outputting the atomized substance for the user to inhale.

In order to increase the atomization amount in a single inhalation of the e-liquid, conventionally, the resistance of the heating wire is reduced, or the driving voltage at both ends of the heating wire is increased to increase the atomization amount. However, after the heating wire operates for a long time, carbon deposits will be generated on its surface, and the longer the operating time of the heating wire, the more carbon will be deposited. Excessive carbon deposits will affect the atomization taste of e-liquid. At the same time, in order to pursue the taste of atomization, the excessive heating power of the heating wire also aggravates and accelerates the generation of carbon deposits. As a result, the amount of e-liquid contained in the disposable e-liquid compartment is limited, and the service life is short. Therefore, few disposable e-cigarette products with a large e-liquid volume are available on the market.

SUMMARY

The present application provides an electronic cigarette having double atomizing cores and a method for controlling the heat balance thereof, in order to tackle the problem of carbon deposits on the single heating wire of the existing electronic cigarettes.

An embodiment of the present application provides an electronic cigarette having double atomizing cores, which includes: a cigarette rod, the cigarette rod includes an oil compartment having a lithium battery, a circuit board, a fixing plate, a first atomizing core, and a second atomizing core arranged therein;

the lithium battery supplies power to the circuit board, and the circuit board controls the first atomizing core and the second atomizing core to maintain balanced heating under a single-core alternating operating mode and a double-core simultaneous operating mode, the fixing plate is used for fixing the first atomizing core and the second atomizing core and is connected with the positive and negative electrodes of the lithium battery.

Optionally, in the electronic cigarette having double atomization cores, the first atomization core and the second atomization core are arranged symmetrically and alongside with each other in the oil compartment.

Optionally, in the electronic cigarette having double atomizing cores, the circuit board is provided with a first heating drive circuit, a second heating drive circuit, and a processor;

the first heating drive circuit controls a heating state of the first atomizing core according to a first drive signal output by the processor, detects a voltage at both ends of the first atomizing core, and feeds the voltage back to the processor;

the second heating drive circuit controls a heating state of the second atomizing core according to a second drive signal output by the processor, detects a voltage at both ends of the second atomizing core, and feeds the voltage back to the processor.

Optionally, in the electronic cigarette having double atomizing cores, the first heating drive circuit includes a first switch transistor, a first resistor, a second resistor, a third resistor, and a fourth resistor;

a gate of the first switch transistor is connected to one terminal of the first resistor and the processor; a source of the first switch transistor is connected to the other terminal of the first resistor, a power supply terminal, and one terminal of the second resistor; a drain of the first switch transistor is connected to the other terminal of the second resistor, one terminal of the third resistor, the other terminal of the fourth resistor, and one terminal of the first atomizing core; the other terminal of the third resistor and the other terminal of the fourth resistor are connected to the processor, and the other terminal of the first atomizing core is grounded.

Optionally, in the electronic cigarette having double atomizing cores, the second heating drive circuit includes a second switch transistor, a sixth resistor, a seventh resistor, an eighth resistor, and a ninth resistor;

a gate of the second switch transistor is connected to one terminal of the sixth resistance and the processor; a source of the second switch transistor is connected to the other terminal of the sixth resistor, the power supply terminal, and one terminal of the seventh resistor; a drain of the second switch transistor is connected to the other terminal of the seventh resistor, one terminal of the eighth resistor, the other terminal of the ninth resistor, and one terminal of the second atomizing core; the other terminal of the eighth resistor and the other terminal of the ninth resistor are connected to the processor, and the other terminal of the second atomizing core is grounded.

A second aspect of the present application provides a method for controlling the heat balance of an electronic cigarette having double atomizing cores, the method includes:

initiating, when starting heating, a corresponding operating mode according to a selection of functions;

selecting, when the operating mode is a single-core operating mode, an atomizing core with a short total heating and atomizing time from the first atomizing core and the second atomizing core to heat; and heating simultaneously the first atomizing core and the second atomizing core when the operating mode is a double-core operating mode.

Optionally, in the method for controlling the heat balance, the step of selecting, when the operating mode is a single-core operating mode, an atomizing core with a short total heating and atomizing time from the first atomizing core and the second atomizing core to heat includes:

reading, when the operating mode is the single-core operating mode, a respective total heating and atomizing time of the first atomizing core and the second atomizing core; and determining whether the total heating and atomizing time of the first atomizing core is greater than the total heating and atomizing time of the second atomizing core; if yes, controlling the second atomizing core to heat; if no, controlling the first atomizing core to heat.

Optionally, in the method for controlling the heat balance, after the step of selecting, when the operating mode is a single-core operating mode, an atomizing core with a short total heating and atomizing time from the first atomizing core and the second atomizing core to heat, the method further includes:

controlling the corresponding atomizing core to stop heating when a heating time is reached, and accumulating the heating time to the total heating and atomizing time of the atomizing core.

Optionally, in the method for controlling the heat balance, the step of heating simultaneously the first atomizing core and the second atomizing core when the operating mode is a double-core operating mode includes:

when the operating mode is the double-core operating mode, outputting a valid first drive signal by the processor to control the first heating drive circuit to supply power to the first atomizing core, outputting a valid second drive signal by the processor to control the second heating drive circuit to supply power to the second atomizing core, and heating simultaneously the first atomizing core and the second atomizing core.

Optionally, in the method for controlling the heat balance, after the step of heating simultaneously the first atomizing core and the second atomizing core when the operating mode is a double-core operating mode, the method further includes:

counting the heating time, and controlling the first atomizing core and the second atomizing core to stop heating when the heating time is reached.

In the technical proposals of the present application, the electronic cigarette having double atomizing cores includes a cigarette rod, the cigarette rod includes an oil compartment having a lithium battery, a circuit board, a fixing plate, a first atomizing core, and a second atomizing core arranged therein; the lithium battery supplies power to the circuit board, and the circuit board controls the first atomizing core and the second atomizing core to maintain balanced heating under a single-core alternating operation and a double-core simultaneous operation, the fixing plate is used to fix the first atomizing core and the second atomizing core and is connected with the positive and negative electrodes of the lithium battery. The double atomizing cores can be heated alternately, which produces less carbon deposits than heating by a single heating wire, which solves the problem of easy carbon deposition in existing e-cigarettes using a single heating wire, and also prolongs the service life of the atomizing cores. The double atomizing cores can be heated simultaneously, which improves the utilization rate of the e-liquid.

DETAILED DESCRIPTION OF THE EMBODIMENTS

Figure 1:
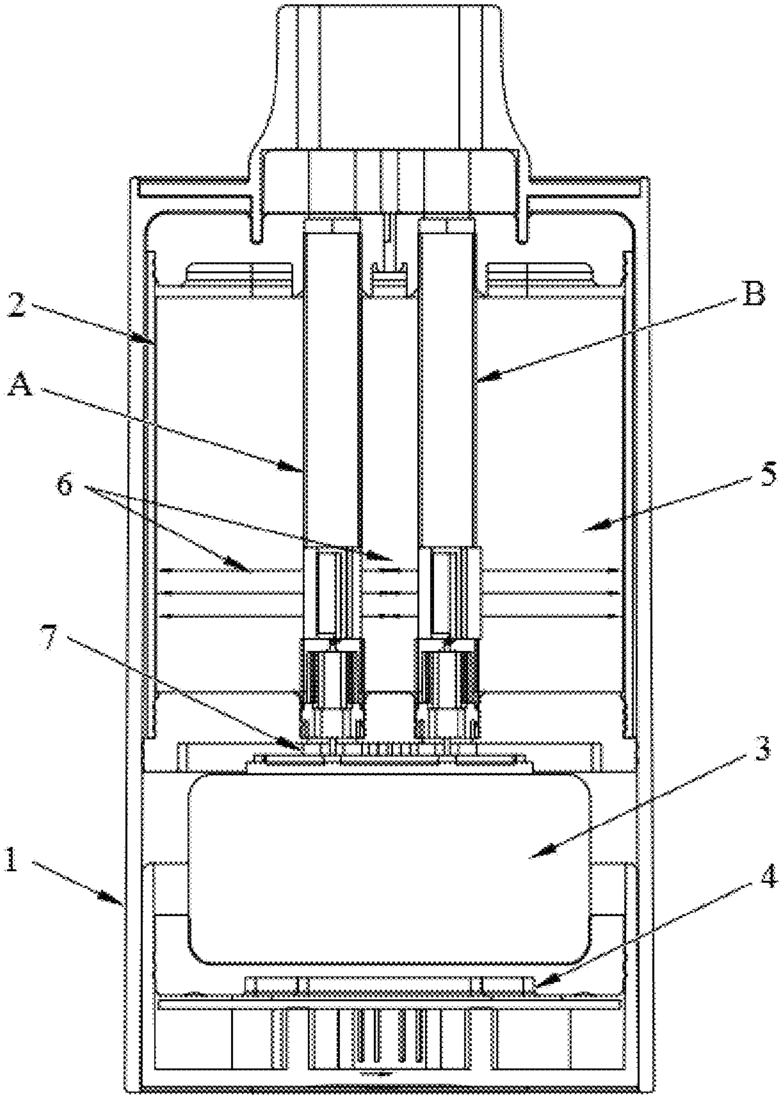
FIG. 1 is a schematic diagram showing the structure of the electronic cigarette having double atomizing cores according to an embodiment of the present application.

The present application will be clearly and completely described below with reference to the accompanying drawings. Obviously, the described embodiments are only a part of the embodiments of the present application, rather than all of them. Based on the embodiments of the present application, all other embodiments obtained by those skilled in the art without making creative efforts fall within the scope of protection of the present application.

It can be understood that relational terms such as first and second etc. used herein are only for distinguishing one object, operation, or direction from another object, operation, or direction, and not requiring nor implying any relationship or order between these objects, operations, or directions. It should be understood that the orientations or positional relationships indicated by terms "upper", "lower", "front", "rear", "left", "right", "inner", "outer", "side", "top", "bottom" etc. are based on the orientations or positional relationships shown in the drawings, and are only for the convenience of describing the application and simplifying the description, rather than limiting the application. In the following description, various parameters and components are described for embodiments with different arrangements, and these specific parameters and components are only examples and do not intend to limit the embodiments of the present application.

Referring to FIG. 1, an embodiment of the present application provides an electronic cigarette having double atomizing cores, which includes: a cigarette rod 1, the cigarette rod includes an oil compartment 2 having a lithium battery 3, a circuit board 4, a fixing plate 7, a first atomizing core A, and a second atomizing core B arranged therein. The circuit board 4 is connected to the lithium battery 3, the first atomizing core A, and the second atomizing core B. the lithium battery 3 supplies power to the circuit board 4, and the circuit board 4 controls the first atomizing core A and the second atomizing core B to maintain balanced heating under a single-core alternating operation and a double-core simultaneous operation, the fixing plate 7 is used to fix the first atomizing core A and the second atomizing core B and is connected with the positive and negative electrodes of the lithium battery 3.

The first atomizing core A and the second atomizing core B share a large-capacity oil compartment 2, and the two atomizing cores are arranged symmetrically alongside with each other in the oil compartment 2. An oil storage cotton 5 is wrapped around the first atomizing core A and the second atomizing core B. The resistance values of the first atomizing core A and the second atomizing core B match each other, that is, the resistance values of the two atomizing cores are close to or equal to each other, so that the heating power can be balanced.

When the electronic cigarette is in the single-core operating mode, the first atomizing core A and the second atomizing core B operates alternately, with only one atomizing core being heated each time, so that the heat is balanced to steadily consume the oil around the atomizing core. Since the duration of which a user uses varies every time, the cumulative heating time of each atomizing core is also different. Therefore, when the two atomizing cores operate alternately, the priority of operation is based on the respective total heating and atomizing time (that is, the cumulative heating time), that is, the atomizing core with a shorter total heating and atomizing time operates first, and a corresponding atomizing core is selected to operate again according to the total heating atomization time at the next heating (re-inhalation). It can be seen from the oil-guiding path 6 in FIG. 1 that, compared with the existing single atomizing core, the oil-guiding radius of the double atomizing core is shorter than that of the single atomizing core under the condition of the same width of the oil compartment 2. When the two atomizing cores consume the same capacity of oil with the situation of the single atomizing core, using two atomizing cores is equivalent to increasing the size of the oil compartment and carrying more oil when using a single-core electronic cigarette. Therefore, the double atomizing core is suitable for the production of e-cigarettes having a large oil compartment, which fills the gap in the market for disposable large-capacity e-cigarettes. At the same time, it can also avoid that, when little oil remains in the oil compartment 2, the remaining oil in the oil compartment 2 is too far away from the atomizing core due to the increased size of the oil compartment 2, causes unsmooth flow of the oil, which then leads to a reduced amount of atomized smoke in a single inhalation, and even burning of the atomizing core.

When the electronic cigarette is in the double-core operating mode, the first atomizing core A and the second atomizing core B operate simultaneously. In this way, the heating power of the respective atomizing core is not increased, while the amount of atomized oil in a single inhalation is increased without shortening the service life of the atomizing core. In the existing technology with a single atomizing core, in order to increase the amount of atomization, the resistance of the atomizing core must be reduced or the driving voltage at both ends of the atomizing core must be increased, such that the heating power can be increased to increase the amount of atomization. However, this must be achieved by optimizing and improving the oil conduction speed and matching the oil conduction and atomizing core (increasing the oil conducting speed through the structure, and increasing the atomizing power by increasing the voltage at both ends of the atomizing core). When the remained oil is reduced during a later stage of using the electronic cigarette, if the oil conduction speed does not match well with the atomizing core, the risk of burning the atomizing core will increase. Moreover, the heating power of the single atomizing core that is too high will also increase the carbon deposit on the atomizing core and reduce the service life of the atomizing core.

Figure 2:
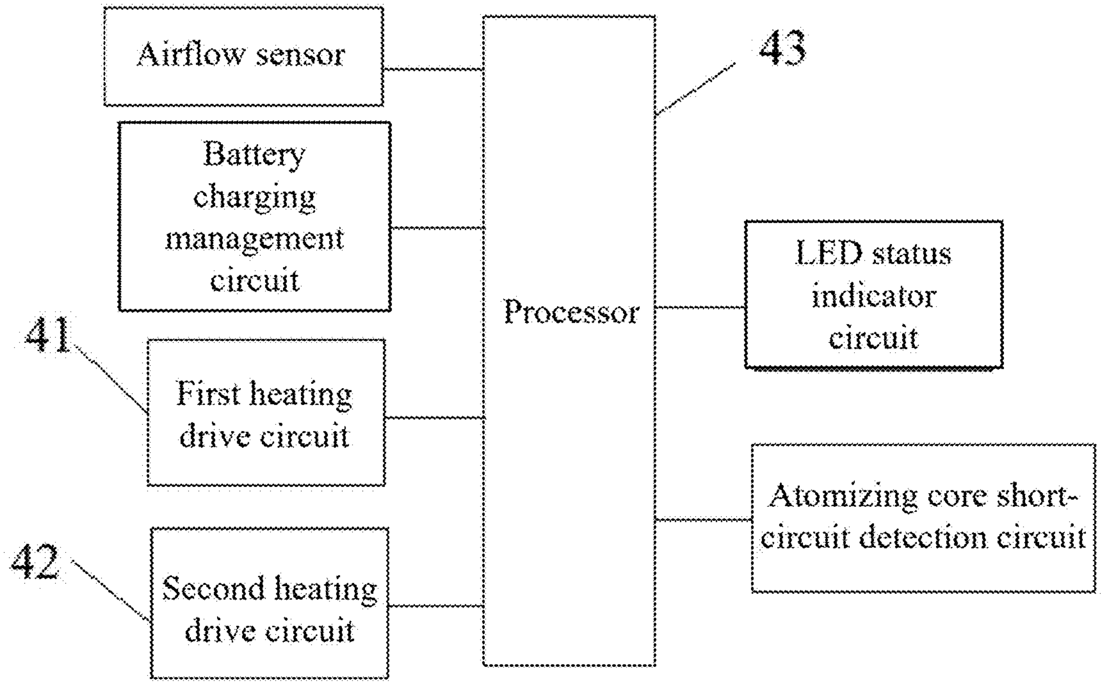
FIG. 2 is a block diagram of the circuit board according to an embodiment of the present application.

Also referring to FIG. 2, the circuit board 4 is provided with a first heating drive circuit 41, a second heating drive circuit 42, and a processor 43 (namely an MCU). The first heating drive circuit 41 is connected to the processor and the first atomizing core A, and the second heating drive circuit 42 is connected to the processor and the second atomizing core B. The first heating drive circuit 41 controls a heating state of the first atomizing core A according to a first drive signal output by the processor, detects a voltage at both ends of the first atomizing core A, and feeds the voltage back to the processor. The second heating drive circuit 42 controls a heating state of the second atomizing core B according to a second drive signal output by the processor, detects a voltage at both ends of the second atomizing core B, and feeds the voltage back to the processor.

It should be understood that the circuit board is also provided with an airflow sensor, a battery charging management circuit, an LED status indicator circuit, an atomizing core short-circuit detection circuit, and the like, which can all be found in the prior art, and the functions and circuit structures are the same. Therefore, it will not be described in detail herein.

Figure 3:
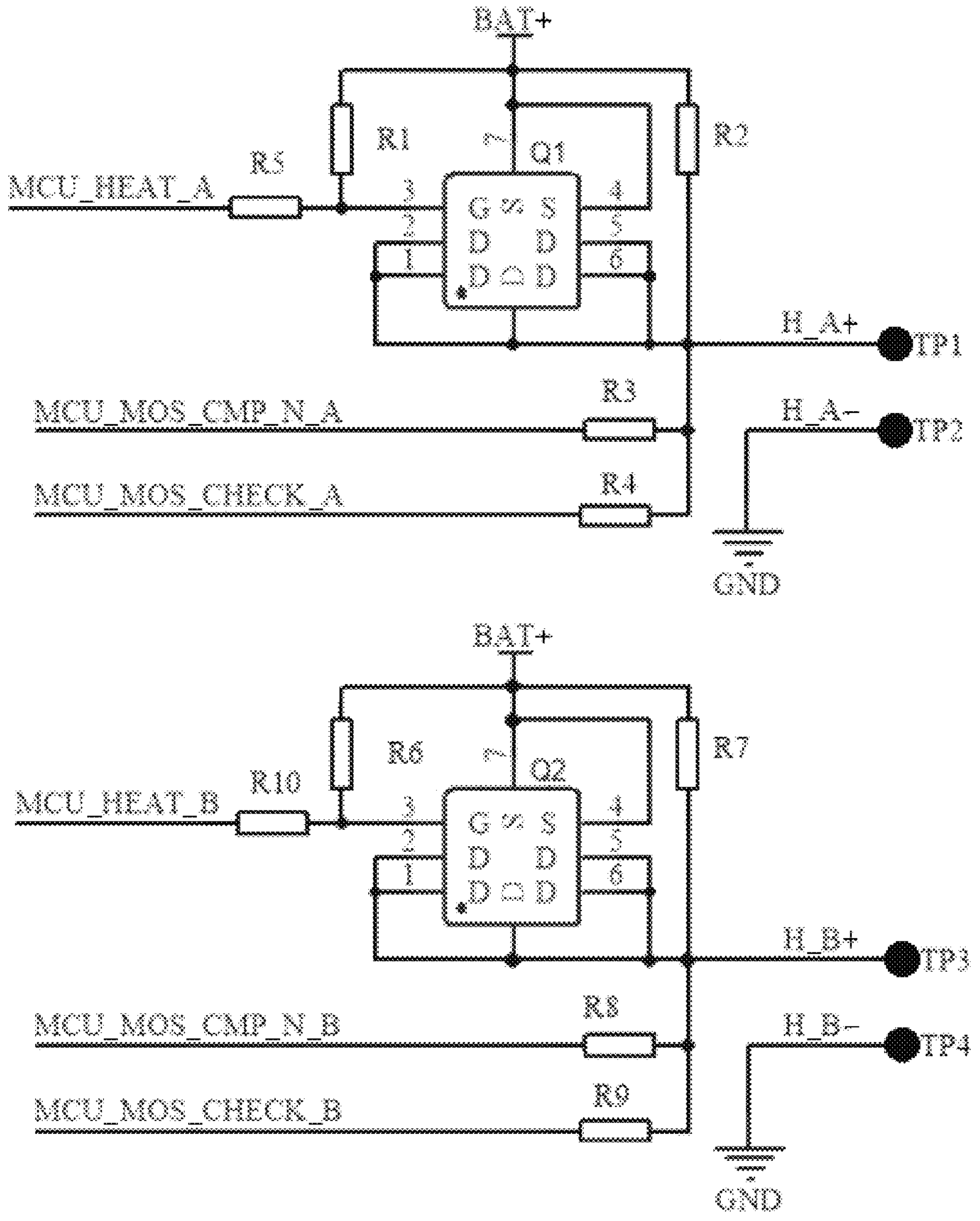
FIG. 3 is a circuit diagram of the first heating drive circuit and the second heating drive circuit on the circuit board according to an embodiment of the present application.

Also referring to FIG. 3, the first heating drive circuit 41 includes a first switch transistor Q1, a first resistor R1, a second resistor R2, a third resistor R3, and a fourth resistor R4. A gate of the first switch transistor Q1 is connected to one terminal of the first resistor R1 and the processor. A source of the first switch transistor Q1 is connected to the other terminal of the first resistor R1, a power supply terminal (namely a positive electrode of a lithium battery), and one terminal of the second resistor R2. A drain of the first switch transistor Q1 is connected to the other terminal of the second resistor R2, one terminal of the third resistor R3, the other terminal of the fourth resistor R4, and one terminal TP1 of the first atomizing core A. The other terminal of the third resistor R3 and the other terminal of the fourth resistor R4 are both connected to the processor, and the other terminal TP2 of the first atomizing core A is grounded.

The first switch transistor Q1 is preferably a PMOS tube of WSD1216DN22 type, and the processor outputs the first drive signal MCU_HEAT_A to control the on and off of the first switch transistor Q1. When the first drive signal MCU_HEAT_A is at a low level, the first switch transistor Q1 is turned on, the battery voltage BAT+ supplied by the lithium battery 3 is output to the first atomizing core A through Q1, and a grounded circuit is formed on the first atomizing core A, so that the first atomizing core A starts to heat once energized. When the first drive signal MCU_HEAT_A is at a high level, the first switch transistor Q1 is turned off, the output of the battery voltage BAT+ is stopped, and the first atomizing core A is powered off to stop heating.

The resistance of the first resistor R1 is preferably 1 kΩ, the first resistor R1 acts as a protection to prevent Q1 from operating automatically when the control terminal of the processor fails. The resistance of the second resistor R2 is preferably 560 kΩ, the second resistor R2 is used for no-load detection, that is, to detect whether the first atomizing core is connected. The resistance of the third resistor R3 and the fourth resistor R4 is preferably 1 kΩ, both resistors are used for current limiting to protect the analog input detection port connected to the processor. Through the sampling of the third resistor R3, a signal MCU_MOS_CMP_N_A is output from the other terminal of the third resistor R3 to the processor. The signal MCU_MOS_CMP_N_A is used to detect the voltage H_A± at both ends of the first atomizing core A. The processor determines whether the atomizing core A is short-circuited according to the voltage value of the signal MCU_MOS_CMP_N_A, so as to realize the over-current protection function. Through the sampling of the fourth resistor R4, a signal MCU_MOS_CHECK_A is output from the other terminal of the fourth resistor R4 to the processor, and the signal MCU_MOS_CHECK_A is also used to detect the voltage H_At± at both ends of the first atomizing core A; the processor determines whether the output voltage of the first atomizing core A when heating meets the operating requirements. When the voltage is low; it is determined that the lithium battery does not have enough power, the processor then controls the LED status indicator circuit to light up the light of a corresponding color to indicate the battery level.

Preferably, the first heating drive circuit 41 also includes a fifth resistor R5, one terminal of the fifth resistor R5 is connected to the gate of the first switch transistor Q1 and one terminal of the first resistor R1, and the other terminal of the fifth resistor R5 is connected to the processor. The resistance value of the fifth resistor R5 is preferably 1 kΩ, which is used for providing current limiting protection on the circuit on which the processor controls Q1 to be turned on and off, so as to avoid burning out Q1.

The second heating drive circuit 42 includes a second switch transistor Q2, a sixth resistor R6, a seventh resistor R7, an eighth resistor R8, and a ninth resistor R9. A gate of the second switch transistor Q2 is connected to one terminal of the sixth resistor R6 and the processor. A source of the second switch transistor Q2 is connected to the other terminal of the sixth resistor R6, the power supply terminal, and one terminal of the seventh resistor R7. A drain of the second switch transistor Q2 is connected to the other terminal of the seventh resistor R7, one terminal of the eighth resistor R8, the other terminal of the ninth resistor R9, and one terminal TP3 of the second atomizing core B. The other terminal of the eighth resistor R8 and the other terminal of the ninth resistor R9 are both connected to the processor. The other terminal TP4 of the second atomizing core B is grounded.

The second switch transistor Q2 is preferably a PMOS tube of WSD1216DN22 type, and the processor outputs a second drive signal MCU_HEAT_B to control the on and off of the second switch transistor Q2. When the second drive signal MCU_HEAT_B is at a low level, the second switch transistor Q2 is turned on, and the battery voltage BAT+ supplied by the lithium battery 3 is output to the second atomizing core B through Q2, so that a grounded circuit is formed on the second atomizing core B, and the second atomizing core B starts to be heated once energized. When the second drive signal MCU_HEAT_B is at a high level, the second switch transistor Q2 is turned off, the output of the battery voltage BAT+ is stopped, and the second atomizing core B is powered off to stop heating.

The resistance value of the sixth resistor R6 is preferably 1 kΩ, which acts as a protection to prevent Q2 from operating automatically when the control terminal of the processor fails. The resistance value of the seventh resistor R7 is preferably 560 kΩ, which is used for no-load detection, that is, to detect whether the second atomizing core B is connected. The resistance values of the eighth resistor R8 and the fourth resistor R4 are preferably 1 kΩ, both resistors are used for current limiting and protect the analog input detection port connected to the processor. Through the sampling of the eighth resistor R8, a signal MCU_MOS_CMP_N_B is output from the other terminal of the eighth resistor R8 to the processor. The signal MCU_MOS_CMP_N_B is used to detect the voltage H_A± at both ends of the second atomizing core B; the processor determines whether the second atomizing core B is short-circuited according to the voltage value of the signal MCU_MOS_CMP_N_B, thereby providing over-current protection. Through the sampling of the ninth resistor R9, a signal MCU_MOS_CHECK_B is output from the other terminal of the ninth resistor R9 to the processor, and the signal MCU_MOS_CHECK_B is also used to detect the voltage H_At± at both ends of the second atomizing core B; the processor determines whether the output voltage of the second atomizing core B when heated meets the operating requirements, when the voltage is low; it is determined that the lithium battery does not have enough power, so that the processor then controls the LED status indicator circuit to light up the light of a corresponding color to indicate the battery level.

Preferably, the first heating drive circuit 41 also includes a tenth resistor R10, one terminal of the tenth resistor R10 is connected to the gate of the second switching transistor Q2 and the one terminal of the sixth resistor R6, and the other terminal of the tenth resistor R10 is connected to the processor. The resistance value of the tenth resistor R10 is preferably 1 kΩ, which is used for providing current limiting protection on the circuit on which the processor controls the on and off of Q2, so as to avoid burning out Q2.

In the single-core operating mode, when the first atomizing core A or the second atomizing core B is heated separately, and the processor will record the cumulative heating time of the first atomizing core A and the second atomizing core B respectively. The first drive signal MCU_HEAT_A and the second drive signal MCU_HEAT_B indicate the duration for which the low level current lasts, therefore, when the next reheating starts, the cumulative heating time of the first atomizing core A and the second atomizing core B will be compared, and the heating core with a shorter heating time will be chosen to operate.

Figure 4:
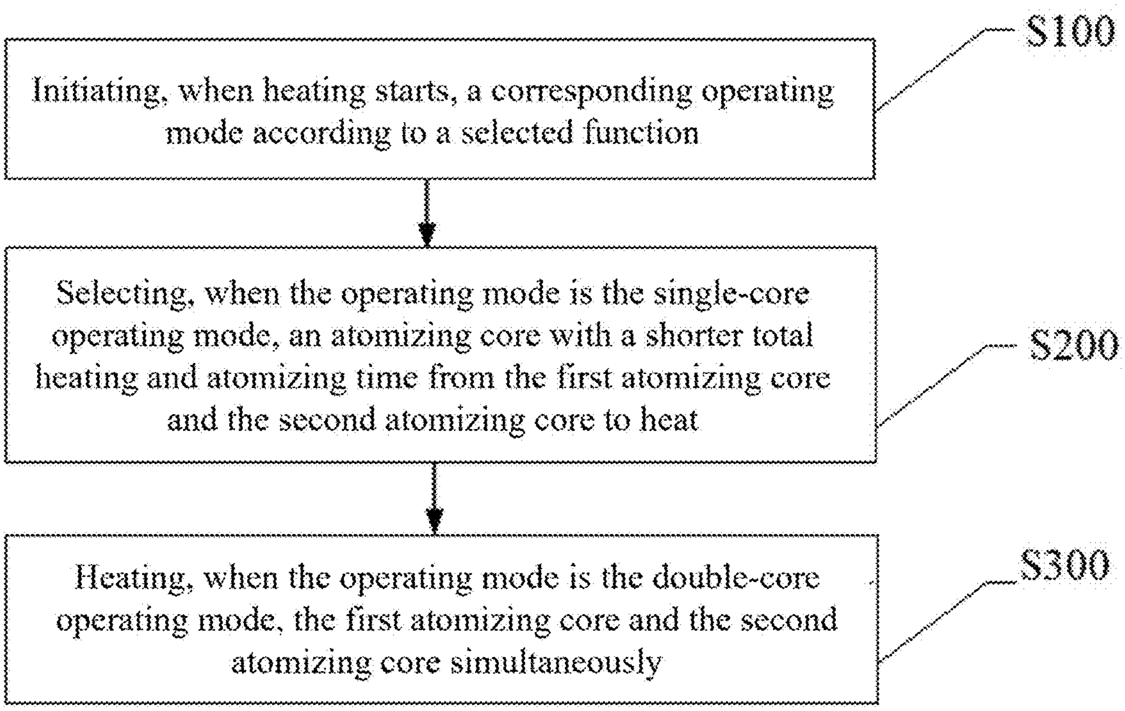
FIG. 4 is a flow chart of the method for controlling the heat balance according to an embodiment of the present application.

Based on the above-mentioned electronic cigarette with double atomizing cores, this embodiment further provides a method for controlling the heat balance of an electronic cigarette with double atomizing cores. Referring to FIG. 4, The method for controlling the heat balance includes the following steps:

- in step S100: when heating starts, a corresponding operating mode is initiated according to the function selected;
- in step S200: when the operating mode is the single-core operating mode, the atomizing core with a shorter total heating and atomizing time is selected from the first atomizing core and the second atomizing core to be heated; and
- in step S300: when the operating mode is the double-core operating mode, the first atomizing core and the second atomizing core are heated simultaneously.

The surface of the cigarette rod 1 is provided with a button (environmentally friendly trigger button), and when the button is detected to be pressed five times by the processor, the cigarette rod is activated to start heating, which can be heated according to the currently selected operating mode. In order to allow time for switching the operating mode, the processor reads the current operating mode and starts timing (for example, 5 seconds) after detecting the activation of the cigarette rod; the operating mode used before switching off last time is selected; the operating mode is switched when pressing of the button is detected before the timing stops, and the user can switch the operating mode for multiple times. When the timing is finished, the currently selected operating mode is read and step S200 or step S300 is executed correspondingly.

In order for the user to know the current operating mode, the processor can control the LED state indicator circuit to display the current operating mode, for example, one indicator light is on in the single-core operating mode, and two indicator lights are on in the double-core operating mode, which is not limited herein.

The step S200 includes:

Step S210: when the operating mode is the single-core operating mode, the respective total heating and atomizing time of the first atomizing core and the second atomizing core is read.

The respective total heating and atomizing time of the atomizing cores is stored in the processor, and when each atomizing core works alone, each heating and atomizing time is timed and accumulated by the processor.

Step S220: it is determined whether the total heating and atomizing time of the first atomizing core is greater than the total heating and atomizing time of the second atomizing core; if yes, the second atomizing core is controlled to be heated; otherwise, the first atomizing core is controlled to be heated.

Since the durations for which the user uses are different every time. In order to balance the operating time of heating and the service life of the two atomizing cores, the atomizing core with a shorter total heating and atomizing time is selected to operate first. If the total heating and atomizing of the first atomizing core A is longer than that of the second atomizing core B, the second atomizing core B will operate; otherwise, the first atomizing core A will operate. If the total heating and atomizing time of the two is equal, the first atomizing core A is selected randomly or by default.

To control the heating of the second atomizing core, the processor outputs a low-level (valid) second drive signal MCU_HEAT_B to control the energize the second switch transistor Q2, the battery voltage BAT+ supplied by the lithium battery 3 is output to the second atomizing core B through Q2, and the second atomizing core B starts heating once energized. resistors R8 and R9 sample the voltage at both ends of the second atomizing core B, and output the signals MCU_MOS_CMP_N_B and MCU_MOS_CHECK_B to the processor, so that the processor can determine whether the second atomizing core B is short-circuited and whether the output voltage during heating meets the operating requirements.

To control the heating of the first atomizing core, the processor outputs a low-level first drive signal MCU_HEAT_A to energize the first switch transistor Q1, and the voltage BAT+ supplied by the lithium battery 3 is output to the first atomizing core A through Q1, and the first atomizing core A starts heating when it is energized. R3 and R4 sample the voltage at both ends of the first atomizing core A, and output signals MCU_MOS_CMP_N_A and MCU_MOS_CHECK_A to the processor, so that the processor can determine whether the first atomizing core A is short-circuited and whether the output voltage during heating meets the operating requirements.

In the heating process of any atomizing core, the processor also times the heating time, and when the heating time is reached, outputs a corresponding invalid drive signal to turn off the corresponding switching transistor, and stops supplying power to the atomizing core to stop heating.

For example, when the heating time of the first atomizing core is reached, the output high-level first drive signal MCU_HEAT_A controls the first switch transistor Q1 to be turned off, the battery voltage BAT+ stops outputting, and the first atomizing core A is powered off and stops heating, the processor accumulates the current heating time into the total heating and atomizing time of the first atomizing core A, and the heating cycle completes. Similarly, when the heating time of the second atomizing core is reached, the output high-level (invalid) second drive signal MCU_HEAT_B controls the second switching transistor Q2 to be turned off, the battery voltage BAT+ stops outputting, and the second atomizing core B is powered off and the heating is stopped, and the processor accumulates the current heating time into the total heating and atomizing time of the second atomizing core B, and the current heating cycle completes.

The step S300 specifically includes: when the operating mode is a double-core operating mode, the processor outputs a valid first drive signal to control the first heating drive circuit to supply power to the first atomizing core, and outputs a valid second drive signal to control the second heating drive circuit to supply power to the second atomizing core, and the first atomizing core and the second atomizing core are heated simultaneously.

During heating, the processor counts the heating time, and when the heating time is reached, the processor outputs an invalid first drive signal to control the first heating drive circuit to stop the power supply, and outputs an invalid second drive signal to control the second heating drive circuit to stop the power supply, the first atomizing core and the second atomizing core are powered off to stop heating, and the current heating cycle completes. Since the two atomizing cores are heated simultaneously, the heating time is the same. Therefore, the total heating and atomizing time does not need to be accumulated.

In summary, because the taste and service life of the atomizing core are affected by the carbon deposition on the atomizing core, in the case of atomizing the same amount of oil, the electronic cigarette with double atomizing cores and the method for controlling the heat balance thereof provided by the present application produce less carbon deposit and have a longer service life than single atomizing core, as double atomizing cores are adopted to generate heat alternately and the respective operating time is balanced.

Because the utilization rate of oil in the oil storage cotton is affected by the distance from the atomizing core to the distal end of the oil storage cotton, the further the distance, the worse the oil conduction performance, and the lower the utilization rate of the oil. In the case of using the same oil storage cotton structure, the double atomizing core can greatly reduce the radius of the oil conduction or the distance of the oil conduction path, and the oil consumption is balanced, which can make the oil at the distal end of the oil compartment smoothly and evenly transferred to the atomizing core, solving the problem of oil transfer in large oil compartments. Compared with the structure of a single atomizing core, the utilization rate of the oil can be improved and the risk of burning the atomizing core due to poor oil conduction can be reduced; at the same time, the consistency of the taste of the double atomizing cores are ensured throughout the early and the later stage of consumption of the oil in the entire oil compartment, and the taste is more balanced, which provides better consistency of the taste throughout the early and the later stage compared to that using a single atomizing core.

The match of resistance of the above-mentioned first atomizing core and the second atomizing core realizes a combined balance of the heating power, the taste of the double atomizing cores, the fuel consumption, and the operating life, thereby realizing a heat balance.

Above embodiment merely show optional embodiments of the present application, and cannot be interpreted as the limitation to the present application. Those skilled in the art can make various changes and modifications without departing from the spirit and scope of the present application. Therefore, the scope of protection of the present application is defined by the appended claims.

What is claimed is:

1. An electronic cigarette having double atomizing cores, comprising a cigarette rod, wherein the cigarette rod comprises an oil compartment, and a lithium battery, a circuit board, a fixing plate, a first atomizing core, and a second atomizing core are arranged in the oil compartment; and wherein the lithium battery supplies power to the circuit board and the atomizing core, and the circuit board controls the first atomizing core and the second atomizing core to maintain balanced heating under a single-core alternating operating mode and a double-core simultaneous operating mode, the fixing plate is used for fixing the first atomizing core and the second atomizing core and is connected with the positive and negative electrodes of the lithium battery;

wherein the circuit board is provided with a first heating drive circuit, a second heating drive circuit, and a processor; and wherein the first heating drive circuit is configured to control a heating state of the first atomizing core according to a first drive signal output by the processor, detect a voltage at both ends of the first atomizing core, and feed the voltage back to the processor; and the second heating drive circuit is configured to control a heating state of the second atomizing core according to a second drive signal output by the processor, detect a voltage at both ends of the second atomizing core, and feed the voltage back to the processor; and wherein the first heating drive circuit comprises a first switch transistor, a first resistor, a second resistor, a third resistor, and a fourth resistor; and wherein a gate of the first switch transistor is connected to one terminal of the first resistor and the processor; a source of the first switch transistor is connected to the other terminal of the first resistor, a power supply terminal, and one terminal of the second resistor; a drain of the first switch transistor is connected to the other terminal of the second resistor, one terminal of the third resistor, one terminal of the fourth resistor, and one terminal of the first atomizing core; the other terminal of the third resistor and the other terminal of the fourth resistor are connected to the processor, and the other terminal of the first atomizing core is grounded.

2. The electronic cigarette having double atomizing cores according to claim 1, wherein the first atomizing core and the second atomizing core are arranged symmetrically and alongside with each other in the oil compartment.

3. The electronic cigarette having double atomizing cores according to claim 1, wherein the second heating drive circuit comprises a second switch transistor, a sixth resistor, a seventh resistor, an eighth resistor, and a ninth resistor; and wherein a gate of the second switch transistor is connected to one terminal of the sixth resistance and the processor; a source of the second switch transistor is connected to the other terminal of the sixth resistor, the power supply terminal, and one terminal of the seventh resistor; a drain of the second switch transistor is connected to the other terminal of the seventh resistor, one terminal of the eighth resistor, one terminal of the ninth resistor, and one terminal of the second atomizing core; the other terminal of the eighth resistor and the other terminal of the ninth resistor are connected to the processor, and the other terminal of the second atomizing core is grounded.

4. A method for controlling heat balance of the electronic cigarette having double atomizing cores according to claim 1, comprising:

initiating, when starting heating, a corresponding operating mode according to a selected function;

selecting, when the operating mode is the single-core alternating operating mode, an atomizing core with a short total heating and atomizing time from the first atomizing core and the second atomizing core to heat; and heating simultaneously the first atomizing core and the second atomizing core when the operating mode is a double-core simultaneous operating mode.

5. The method for controlling heat balance according to claim 4, wherein the step of selecting, when the operating mode is the single-core alternating operating mode, an atomizing core with a short total heating and atomizing time from the first atomizing core and the second atomizing core to heat comprises:

reading, when the operating mode is the single-core operating mode, a respective total heating and atomizing time of the first atomizing core and the second atomizing core; and determining whether the total heating and atomizing time of the first atomizing core is greater than the total heating and atomizing time of the second atomizing core; if yes, controlling the second atomizing core to heat, if no, controlling the first atomizing core to heat.

6. The method for controlling heat balance according to claim 5, wherein after the step of selecting, when the operating mode is the single-core alternating operating mode, an atomizing core with a short total heating and atomizing time from the first atomizing core and the second atomizing core to heat, the method further comprises:

controlling a corresponding atomizing core to stop heating when a heating time is reached, and accumulating the heating time to the total heating and atomizing time of the corresponding atomizing core.

7. The method for controlling heat balance according to claim 4, wherein the step of heating simultaneously the first atomizing core and the second atomizing core when the operating mode is the double-core simultaneous operating mode comprises:

outputting, when the operating mode is the double-core operating mode, a valid first drive signal by the processor to control the first heating drive circuit to supply power to the first atomizing core, outputting a valid second drive signal by the processor to control the second heating drive circuit to supply power to the second atomizing core, and heating simultaneously the first atomizing core and the second atomizing core.

8. The method for controlling heat balance according to claim 7, wherein after the step of heating simultaneously the first atomizing core and the second atomizing core when the operating mode is the double-core simultaneous operating mode, the method further comprises:

counting a heating time, and controlling the first atomizing core and the second atomizing core to stop heating when the heating time is reached.

* * * * *